United States Patent

Ponder et al.

[11] Patent Number: 6,000,437
[45] Date of Patent: Dec. 14, 1999

[54] COATED LINER FOR CURVED DUCTS

[75] Inventors: Thomas E. Ponder, Broomall; David Pacana, Spring City; John O. Ruid, Schwenksville, all of Pa.

[73] Assignee: Certain Teed Corporation, Valley Forge, Pa.

[21] Appl. No.: 09/008,177

[22] Filed: Jan. 16, 1998

[51] Int. Cl.$^6$ .............................. F16L 9/14; F16L 11/12
[52] U.S. Cl. ........................................ 138/149; 138/128
[58] Field of Search .................................. 138/149, 158, 138/128; 428/245; 137/15; 122/494

[56] References Cited

U.S. PATENT DOCUMENTS

| | | | |
|---|---|---|---|
| 3,557,840 | 1/1971 | Maybee | 138/149 |
| 3,885,593 | 5/1975 | Koeber et al. | 138/128 |
| 4,621,013 | 11/1986 | Holtrop et al. | 428/245 |
| 4,680,070 | 7/1987 | Hughes | 138/149 |
| 4,909,282 | 3/1990 | Staugaard | 138/149 |
| 4,990,370 | 2/1991 | Terry et al. | |
| 5,020,481 | 6/1991 | Nelson | 122/494 |
| 5,310,594 | 5/1994 | Holland et al. | 138/158 |
| 5,567,504 | 10/1996 | Schakel et al. | |
| 5,765,586 | 6/1998 | Facas et al. | 137/15 |

FOREIGN PATENT DOCUMENTS 0763690   3/1997   European Pat. Off. .

*Primary Examiner*—Andres Kashnikow
*Assistant Examiner*—Davis Hwu
*Attorney, Agent, or Firm*—Jeffrey C. Lew

[57] ABSTRACT

An acoustical and thermal energy insulating liner for gas transfer ducts, primarily in heating, ventilating and air conditioning applications is provided for installation within ducts having curvilinear cross section. The liner is made from a rectangular central block of insulating material such as foam or nonwoven web of glass fibers. A plurality of grooves running the full length of the block second major dimension and parallel thereto are cut through the front face of the block to a depth short of the block thickness. The front face is coated with an elastically deformable substance that forms a barrier layer adjacent the substrate insulating material. The barrier layer bridges the gaps of the grooves and thus contains the insulating material at the floor and side walls of the grooves internal to the central block.

The barrier layer can be formed after the grooves are cut by spreading across the front face of the central block a layer of foam. The foam is devolatilized to leave a thin, flexible, contiguous barrier layer coextensive with the front face.

In use, the liner is flexed about pivotal axes parallel to and between the grooves and the back face of the block. The flexed liner can form a tube with the coated front face exhibiting concave curvature in a plane perpendicular to the pivotal axes. The tube can be inserted into a gas transfer duct.

14 Claims, 7 Drawing Sheets

COATED LINER FOR CURVED DUCTS

FIELD OF THE INVENTION

This invention relates to an insulation liner for air conveying ducts. More specifically, it relates to a coated-face acoustically and thermally insulative composite for lining heating, ventilating and air conditioning ducts that have a curvilinear cross section.

BACKGROUND AND SUMMARY OF THE INVENTION

A commercially significant fraction of air conveying ducts for modern heating, ventilating and air conditioning ("HVAC") systems is constructed of thin walled sheet metal. Flow of air or other gases through such ducts can be disturbingly noisy. Furthermore, bare metal ducts can transmit excessive amounts of heat into or out of the conveyed gas. Often it is desired to reduce the transmission of heat and noise through sheet metal air conveying ducts to conserve energy, to maintain the conveyed air within a specified temperature range, to prevent moisture from condensing on or in the duct, and to attenuate offensive noise.

One technique for reducing heat and noise emanating from sheet metal ducts involves applying an appropriate insulating material to a surface of the duct. The insulation can be placed outside the duct, but most effective sound dampening is usually achieved by insulating the interior wall of the duct. Frequently system designs call for installing thermal insulation inside ducts too.

Acoustical and thermal insulation for HVAC ducts frequently is of a web of nonwoven glass fibers in roll or sheet form. Preferably such insulation is prefabricated in semi-rigid, flat sheets of one inch or more thickness. The insulation may be laminated on one or both faces with skins of foil, mesh, paper, film and the like. The skin can provide a surface for conveniently attaching the laminate to a duct wall. It also adds somewhat to the structural integrity of the laminate. Further, a skin on the air stream face can reduce the amount of energy required to blow air through the duct. Lining rectilinear cross-section ducts with semi-rigid flat sheet insulation is generally manageable because the duct walls are also flat.

Lining a curvilinear cross-section ("curved") duct with flat sheet insulation remains problematic, however, because the insulation must distort to conform with the curvature. One traditional method of lining a curved duct is described in European Patent Application EP 0763690 A2. That method involves placing layers of insulation blankets intermediate between an outer duct and a smaller diameter, perforated tube concentric with and internal to the outer duct. The labor required to properly assemble such double wall ducts is considered unfavorably expensive.

Another technique provides self-supporting, tubular preforms molded to the curvature of selected sized ducts. The tubular preform is inserted into the duct and held in place by various attachment means. This technique suffers from the draw back that molding technology practically limits the maximum duct size for which the tubular preform can be made. It also requires that specifically sized preforms be selected to insert within given ducts.

The above-mentioned EP 0763690 A2 discloses a modern approach to lining ducts which calls for providing a plurality of parallel narrow grooves in the gas stream surfaces of flat insulation boards. The boards can be curved or bent about an axis parallel to the grooves and opposite lateral edges then can be abutted and fastened together to form a tube. The tube then can be inserted into a duct.

The gas stream surface of the grooved insulation board can be coated with a polymeric layer, however the lateral surfaces of the grooves expose uncoated insulation material. The shoulders of the grooves are designed to mate in compression when the grooved insulation board is curved. The mated shoulders of a correctly dimensioned insulation board thus would seal the exposed insulation of the lateral surfaces from the gas stream. The insulation board dimensions, e.g., thickness of board, depth of grooves, distance between grooves, must be selected perfectly to assure that the shoulders seal off the lateral surfaces. Furthermore, when such grooved insulation board is installed in flat oval ducts, the shoulders of the grooves along the flat portions do not mate.

U.S. Pat. No. 5,567,508 provides a glass fiber duct board with coated grooves. The patent discloses a method of cutting grooves into a face-coated insulation board, depositing a polymeric coating material into the grooves and then distributing the deposited material over the surfaces of the grooves with a wiper blade to coat the surfaces. Such a coated groove board would appear ideal for the utility of lining ducts in the manner disclosed by EP 0763690. It can be readily appreciated, however, that the process for coating the grooves is quite complicated and the apparatus requires wiper blades adapted to the size and shape of the selected grooves. A simpler, more efficient method of producing an insulation board for curved ducts is desirable.

Accordingly, the present invention provides an insulation sheet comprising:

a rectangular central block of insulating material, the block having a first major dimension and a second major dimension together defining a front face and a rear face in parallel planes distant by a thickness; the block further having a plurality of grooves penetrating the front face to a floor at a depth less than the thickness and extending parallel to the second major dimension, the grooves being spaced apart from other grooves in the first major dimension direction and running the length of the second major dimension, each of the grooves having side walls which intersect with the front face to form opposing contact edges separated by a gap; and a contiguous barrier layer of an elastically deformable substance coextensive with the front face and bridging the gaps between opposing contact edges, thereby confining the insulating material of the side walls and floor of each groove to a space internal to the central block.

There is also provided an insulation tube that includes the above-described, novel insulation sheet which has been flexed about a groove axis parallel to the second major dimension of the central block such that the front face exhibits an approximately concave curvature viewed in a plane perpendicular to the axis.

Still further the present invention provides a duct for an air conveying utility, such as HVAC, in which the duct comprises a tubular metal case having an axis of elongation; and the novel, flexed insulation sheet inserted in the metal case.

Additionally, a novel method of making the insulation sheets of this invention has been developed. The new method comprises providing a rectangular central block of insulating material, the block having a first major dimension and a second major dimension together defining a front face and a rear face in parallel planes distant by a thickness;

cutting a plurality of grooves that penetrate the front face to a floor at a depth less than the thickness and extend parallel to the second major dimension, the grooves being spaced apart from other grooves in the first major dimension direction and run the length of the second major dimension, each of the grooves having side walls which intersect with the front face to form opposing contact edges separated by a gap;

foaming an elastically deformable substance in a liquid;

after cutting of grooves, depositing on the front face a bead of the foamed liquid along the length of the second major dimension;

drawing toward the bead in the first major dimension direction a blade in contact with the front face, thereby coating the front face with foam; and devolatilizing the foam to form a contiguous barrier layer of the elastically deformable substance coextensive with the front face and bridging the gaps between opposing contact edges.

The new method presents the advantage that conventional insulation sheet manufacturing equipment can be readily adapted to fabricate the novel insulation sheets. The grooves of the novel sheets are cut parallel to the second major dimension which corresponds to the cross machine direction of conventional insulation producing machinery. The barrier layer is easily applied by dispensing the elastically deformable substance in the form of foam at a leading end of the sheet and by drawing the foam over the surface of the sheet to the following end. This step can be accomplished quite simply as the sheet moves in the machine direction under a stationary doctor blade.

The present invention features insulation for the interior of a curved duct which closely conforms to the contour of the duct without distorting the insulation. Very importantly, by virtue that the barrier layer bridges the gap between side walls of the grooves, it seals off the conveyed gas stream from all underlying insulation material exposed at the side wall. This barrier effect is complete even for flat ducts sections where absence of curvature eliminates compression between opposing contact edges and does not close the gap between side walls.

DETAILED DESCRIPTION

The terms "first major dimension" and "second major dimension" are used herein to designate the overall longitudinal dimensions of the insulation sheet. These dimensions are usually perpendicular to each other to define a rectangular insulation sheet. Normally, the first major dimension is longer than the second major dimension, although this relationship is not limiting. The novel insulation sheet can be produced on continuous manufacturing operations which are characterized by a machine direction (i.e., the direction parallel to sheet travel during manufacturing) and a cross machine direction (i.e., the direction perpendicular to the machine direction). The novel insulation sheet can be fabricated with either its first or second major dimension aligned with the machine direction, however, generally herein, the first major dimension corresponds to the machine direction and the second major dimension corresponds to the cross machine direction.

FIGS. 1, 1a, 2 and 2a illustrate an embodiment according to the present invention of an insulation sheet 1 which has the form of a block 2 of insulating material defined by a first major dimension, w, and a second major dimension, L, which jointly define the parallel planes of front face 5 and rear face 7, hidden from view in the figures. Front and rear faces are distant from each other by the thickness of the block, T.

A plurality of narrow grooves 14 are cut into front face 5 and extend parallel to the second major dimension direction. The grooves run across the full length of the second major dimension and are spaced apart from each other in the first major dimension direction. The grooves penetrate the front face to define a floor 16 located a depth distance 17 below the front face but which is less than the block thickness, T. The thin cross section 18 of the block between the floor 16 and rear face 7 provides a pivot axis 9 for flexing the insulation sheet in a direction parallel to the second major dimension. To obtain good flexibility, the grooves should descend to greater than half of the block thickness. Preferably, the groove depth should be about 50–95% of the thickness. Other factors, such as block thickness, insulating material stiffness, groove-to-groove spacing and width of the groove also impact upon insulation sheet flexibility, as will be discussed in greater detail, below.

The figure also shows that the grooves possess oppositely facing side walls 19a and 19b. The lines of intersection of the side walls with front face 5 define opposing contact edges 20a and 20b separated by a gap 13. The grooves allow the insulation sheet to be flexed about the pivot axes without breaking the sheet. Flexing is performed primarily by forcing the lateral ends 8 upward and inward while applying downward pressure on the central portion of the sheet as shown by the arrows A and B in FIG. 1a. When the sheet is flexed in this manner to form an insulation tube, opposing contact edges move toward each other. Flexing causes the gap to diminish, and in the extreme, the opposite edges may come into contact and thereby completely close the gap.

In a basic embodiment, the central block consists essentially of a monolithic mass of insulating material. The insulation can be any of the well known insulating materials such as a cellular foam or a web of nonwoven fibers. Generally, these insulating materials have low density in the range of about 0.5–7 lbs/ft$^3$. Preferably they are slightly compressible and thus exhibit semi-rigidity. This compressibility allows the insulating sheet to flex to slight angles, especially about the pivot axes at the thin cross sections 18, without breaking or tearing the sheet.

In a preferred embodiment, the central block includes a monolithic layer of nonwoven glass fiber insulation in which the fibers are entangled during web fabrication and glued together at numerous, random crossover points by a binder component. Other conventional methods of preparing the glass fiber insulation are also acceptable. The fiber diameter preferably is in the range of 3 to 25 $\mu$m. The thickness of the single layer, which also is the thickness, T, of the central block preferably is about 0.5–6 inches.

Front face 5 of the insulation sheet is covered by a contiguous barrier layer 3 of an elastically deformable substance. The barrier layer is coextensive with the front face and bridges the gaps at spans 12 between opposing contact edges. The spans thus confine the insulating material of the side wa ls 19a, 19b and floor 16 of each groove to a space internal to the central block.

In use the insulation sheet is installed with the barrier layer facing the stream of gas being conveyed. The barrier layer covers not only the flat planar portions of the front face 10 which remain after grooves are cut, but also the grooves, themselves. Consequently, the gas stream cannot impinge upon the internal groove surfaces due to the presence of the intermediate barrier layer.

Significantly, the internal surfaces of all grooves are isolated from the gas by the spans regardless of the degree to which opposing contact edges approach each other. That is, universal edge-to-edge contact is not necessary to achieve complete isolation. This is particularly important in flat oval duct lining utilities wherein no pivoting occurs at grooves along the flat portions of the duct.

The elastically deformable substance of the barrier layer consists essentially of a polymeric component. Preferably, the barrier layer is formed from a devolatilized foam composition that includes the polymeric component. For example, the polymeric component can be present as a solute dissolved in a liquid solution which is foamed. As the foam devolatilizes, polymer precipitates out of solution to form the barrier layer. By way of another example, the polymer can be discrete particles dispersed in a foamed liquid carrier in which case the particles aggregate and coalesce as the carrier is removed. The layer formed by the aggregating and coalescing particles can be treated thermally or chemically, as for example with a catalyst, to cure the barrier layer. The treating chemical can be applied after aggregation or in the foamed liquid carrier.

Devolatilization involves both removal of foam producing gas entrained in the polymeric component and removal of liquid carrier residue. The the barrier layer can retain a foam structure at conclusion of devolatilization. The devolatilization step thus results in the formation of a microporous or nonporous, thin layer of dry, flexible, resilient polymer on the front face of the central block. Preferably the devolatilized polymeric foam is applied in a substantially uniform coating thickness on the front face to yield an average surface density in the range of 2 to 30 g dry weight per square foot of front face area.

The barrier layer should be firmly bonded to the front face. Adhesive can be added to the foam composition to cause the devolatilized polymeric component to bind to the insulating material substrate. When the foam includes a polymer solution, the polymer itself may bind to the substrate directly upon precipitation. The usually porous nature of the insulating material facilitates seeping of the devolatilizing foam into the substrate which creates a firm bond. Intrusion of the foam into the interstices of the substrate can occur as a result of porous diffusion, gravity, suction applied from the rear face to draw the foam into the pores, pressure applied above the front face, or a combination of these.

The polymeric component can be any well known elastomeric polymers, such as the polymeric latex material disclosed in U.S. Pat. No. 5,567,504, the complete disclosure of which is incorporated herein by reference. An acrylic polymer latex is preferred.

That the polymeric component is applied to the front face in a foam is deemed very important to the success of making the novel insulating sheet. The foam is formulated to have sufficient temporary structural integrity that it can bridge the gap between contact edges and then devolatilize to form the desired barrier layer over the grooves. If the stability of the foam is too low, the foam will break quickly and fall into the grooves before the polymeric component has formed self supporting spans. This can leave a portion of the side walls and floor uncoated by the barrier layer in that the preferred method of preparing the novel insulation sheet does not provide for assuring that these surfaces are thoroughly coated as hi the aforementioned U.S. Pat. No. 5,567,504. If the foam stability is too high, it may be difficult to spread evenly over the front face and may not adhere firmly to the substrate insulation. This can lead to barrier layer delamination later in service.

The foam is formed by any of the methods well known in the art. For example, a liquid composition containing the polymeric component can be whipped in the presence of a gas with high intensity agitation to entrap gas bubbles, the gas can be blown through a dispersing tube such as a flitted nozzle, into a container of a liquid from below the surface to form the foam, or the gas can be blown through a spray nozzle simultaneously with the liquid. Any gas can be used and air is preferred. Surfactants or other foam forming adjuvants may be incorporated into the liquid to facilitate the formation of foam.

To achieve good results it has been found desirable to provide the foam in a thick, creamy consistency, like that of shaving cream. The foam should be capable of devolatilizing after a short time to leave a thin coat of polymer on the front and bridging the gaps of the central block. Successful results can be obtained from foam having consistency determined by density of about 0.1–0.9 g/cm$^3$.

Figure 1:
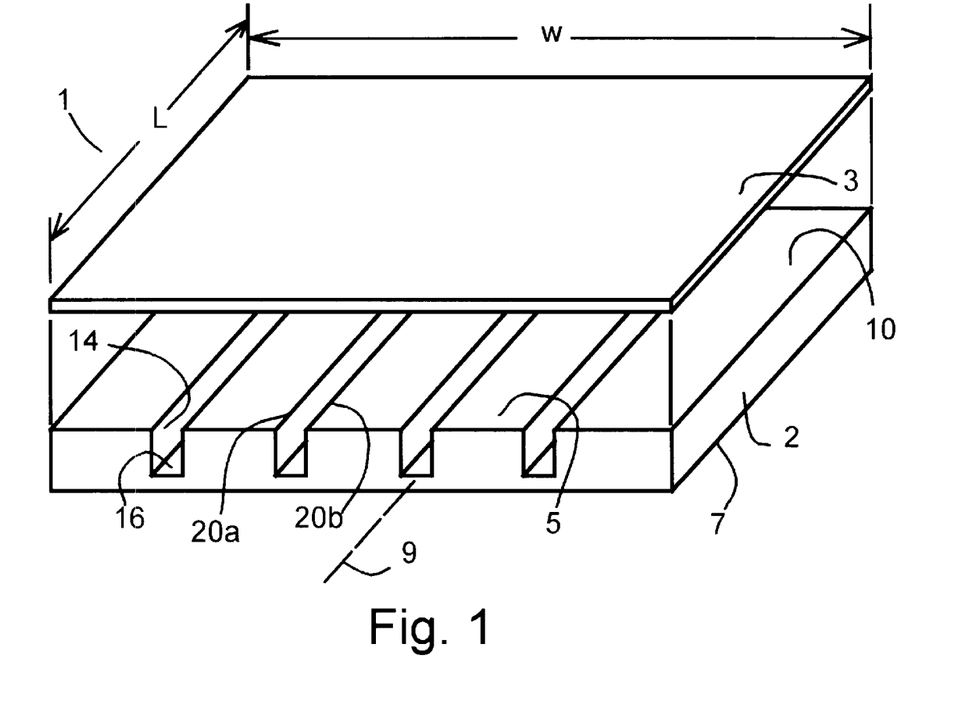
FIG. 1 is an exploded perspective view of an embodiment of an insulation sheet according to the present invention.

While the insulation sheet ideally has the structure of a perfectly flat barrier layer attached to the front face and bridging the gaps, gravitational force tends to cause the devolatilizing foam to sag slightly into the grooves as shown with exaggeration in FIG. 1. This is especially prevalent when the foam is applied to insulation material in a horizontal orientation. The sagging characteristic does not detract from the operability of the invention unless so severe that the spans are broken. Indeed, some sagging is desirable in that it urges the barrier layer of the spans to flex inwardly into the grooves when the sheet is flexed at the pivotal axes. Inward flexure of the spans presents a smoother face to the conveyed gas stream for better gas flow dynamics.

Figure 6:
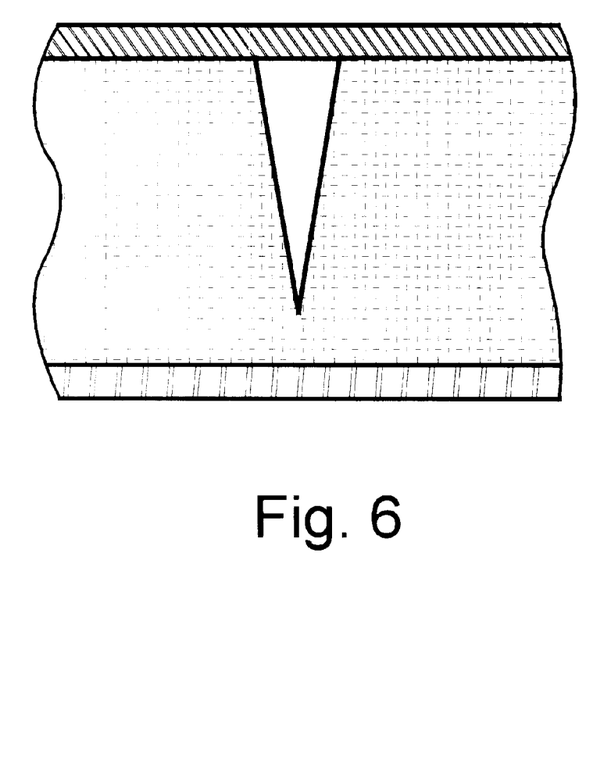
FIG. 6 is a partial cross section elevation view seen in the second major dimension direction of a converging V-shaped side wall cross section embodiment of the novel insulation sheet.
Figure 7:
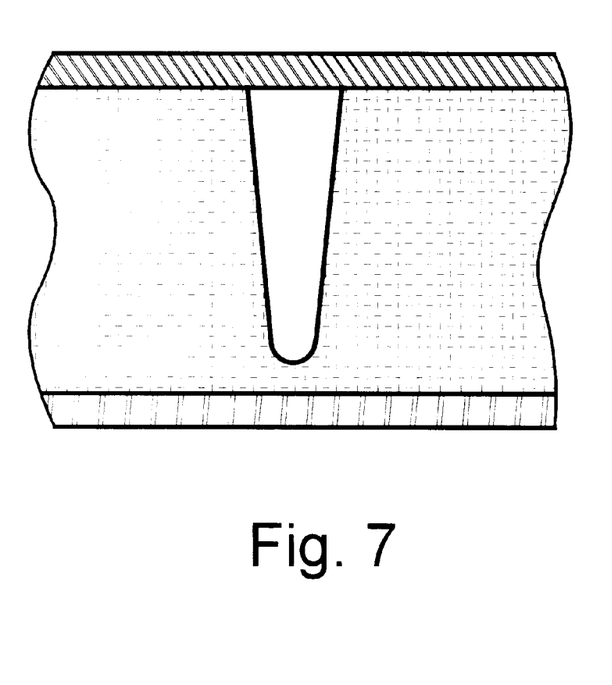
FIG. 7 is a partial cross section elevation view seen in the second major dimension direction of an embodiment of the novel insulation sheet showing a V-shaped side wall groove with a curved floor.

A diverse variety of groove shapes are suitable for use in the present invention. In addition to the flat-floored U-shaped cross section illustrated in FIGS. 1a and 2a, the groove can, for example, have a multi-tiered vertical side wall cross section (FIG. 4), V-shaped wall, flat-floor cross section (FIG. 5) and converging V-shaped side wall cross section (FIG. 6) configurations. The cross section may also have an asymmetric stepped cross section as disclosed in FIG. 6 of the aforementioned U.S. Pat. No. 5,567,504. As well as flat floors, the groove bottoms can be curved as in FIG. 7.

The number of grooves cut into any particular insulation sheet is determined by the degree of curvature that is desired of the flexed sheet and is not limited to the number shown in the figures. The number of grooves is a function of the gap size, the spacing between adjacent grooves and the length of the first major dimension of the sheet. Thickness of the central block, cross section shape of the groove and depth of the groove can play a role in choosing gap size. Gap size generally is in the range of about 1/16–1/2 inch, and preferably is about 1/8–3/8 inch. By spacing between adjacent grooves is meant the distance S between centerlines 22. Equal spacing between all adjacent grooves of an insulation sheet is preferable, however, sheets adapted to special utilities can have unequal spacings. Groove spacing in the range of about 1–3 inches is preferred for sheets with central blocks of about 1–6 inch thickness and gap size of about 1/16–3/8 inch.

Figure 3:
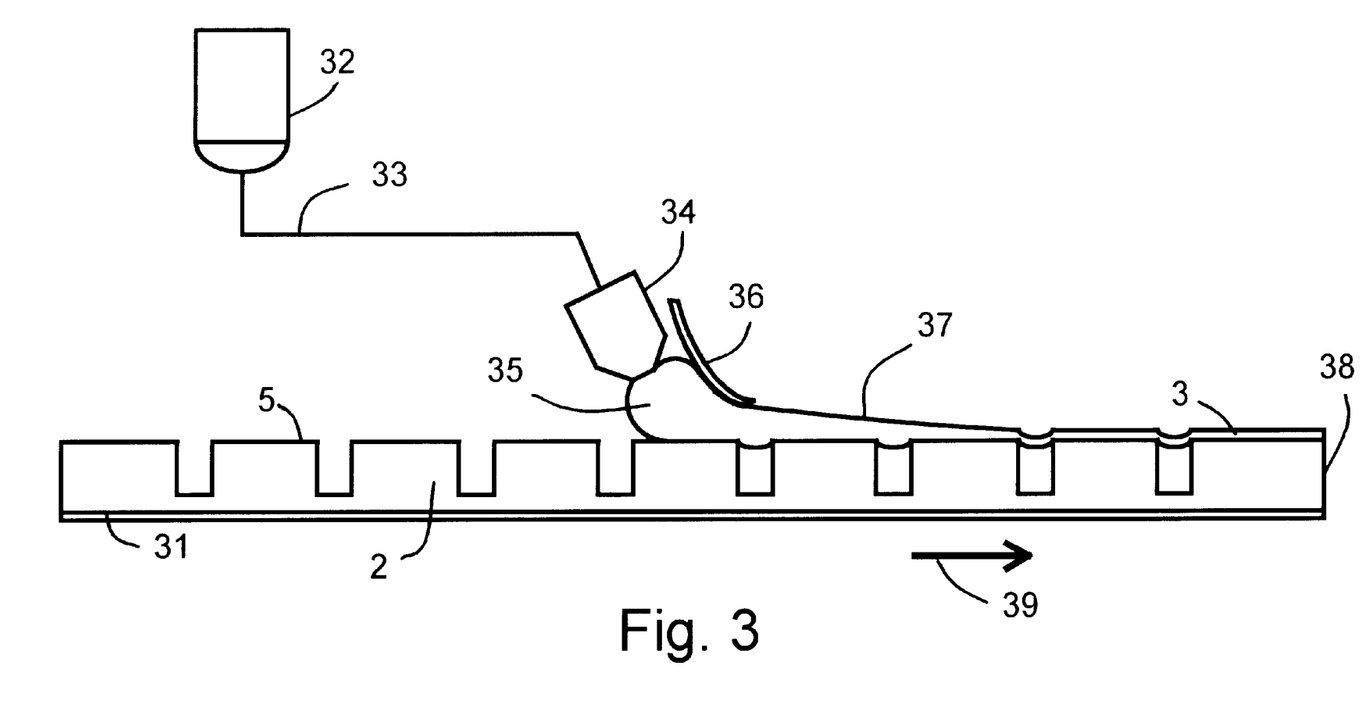
FIG. 3 is an elevation view in the second major dimension direction of an embodiment of the present invention during application of foam to form the carrier layer on the central block.

A method of applying the barrier layer to the central block is illustrated in FIG. 3. Foam is prepared in an appropriate make up facility 32 represented schematically and conveyed to the site of application through a transfer line 33. The transfer line terminates in an applicator nozzle 34 which is adapted to deposit a bead 35 of foam extending along the full length of the second major dimension of the front face 5 of the central block 2. For example, the foam can be placed onto the block by a multiplicity of spray nozzles or by one or more slit dies. Initially, the bead is laid near a leading lateral end 38. A blade 36 mounted on support equipment, not shown, is drawn along the first major dimension behind the bead in close proximity to the front face to produce a coating of foam 37 on the block. A variety of techniques can be used. For example, the sheet can be held stationary while the nozzle and blade are drawn away from the leading end. Another suitable technique involves maintaining the nozzle and blade stationary while moving the sheet in a machine direction shown by the arrow 39. The clearance between blade 36 and front face 5 illustrated in FIG. 3 is exaggerated for sake of clarity. In actual practice, the clearance should be much smaller and may be non-existent, i.e., the blade touches or even presses into the front face.

After a uniform coating of foam has been laid down, the foam is devolatilized. This can be accomplished by simply waiting for the foam bubbles to destabilize with time or by accelerating devolatilization. Representative accelerating techniques include, for example, heating the foam coated board, blowing a dry gas onto the surface of the foam and a combination of these. Finally, the composite insulation sheet can be treated by means adapted to cure the polymeric component of the foam in such a way as to set a self supporting, uniform, barrier layer 3 on the insulating material.

Figure 4:
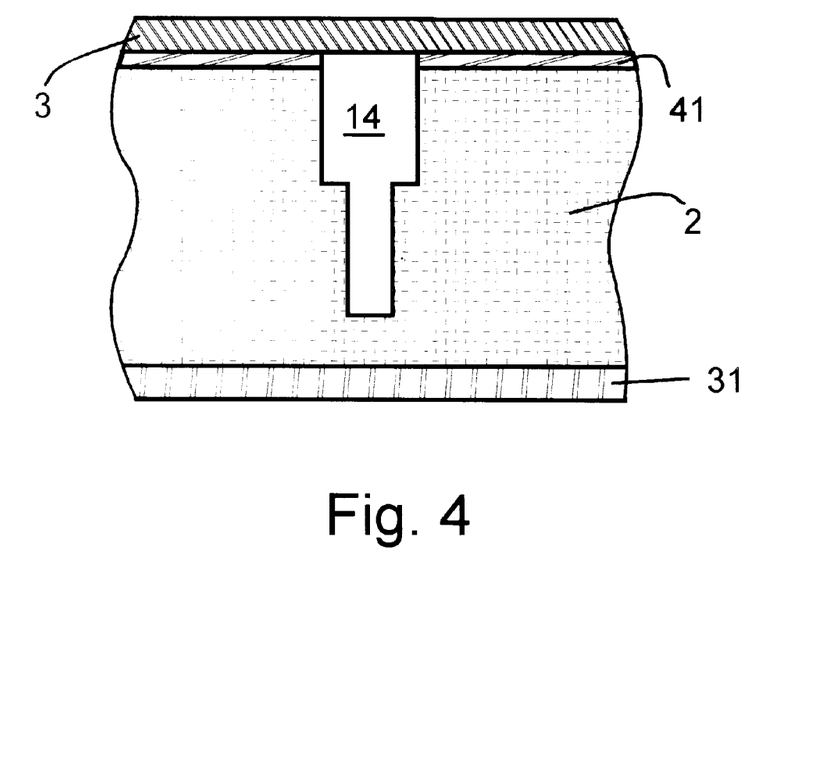
FIG. 4 is a partial cross section elevation view seen in the second major dimension direction of an embodiment of the novel insulation sheet showing a vertical side walled, tiered groove cross section.
Figure 5:
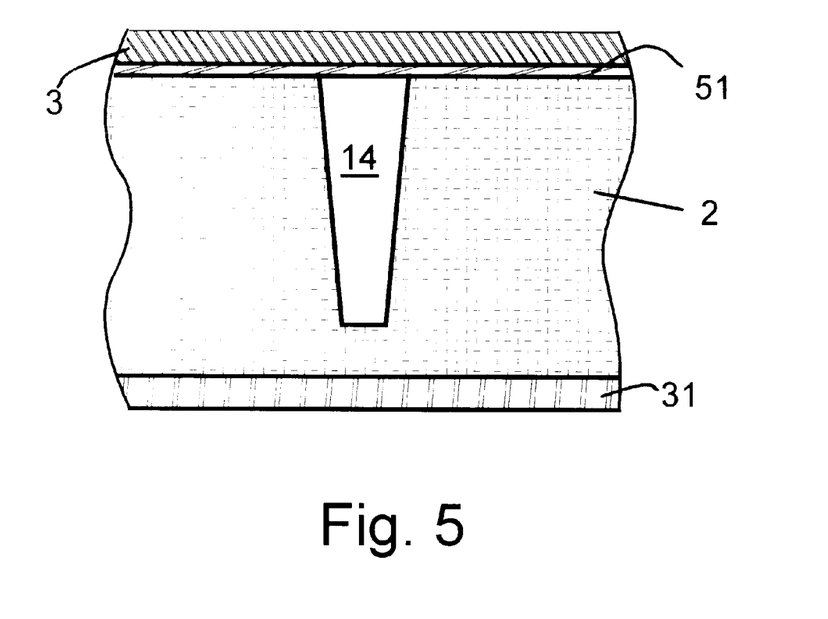
FIG. 5 is a partial cross section elevation view seen in the second major dimension direction of an embodiment of the novel insulation sheet showing a V-shaped side wall groove with a flat floor.

With reference to FIGS. 3–5, it is seen that the rear face of the central block can optionally be covered with a backing layer 31 of foil, mesh, paper, film or combination thereof. The backing layer is coextensive with the rear face and is adhered to the insulating material. A preferred backing layer includes a paper sheet with an exterior foil coating and reinforced with a coarse fiber web. Particular preference is given to reinforcement with a nonwoven fiber web. The backing layer is flexible and can conform to the contour of the curved duct in which the flexed insulating sheet is installed. The backing layer is not penetrated during groove formation, and consequently, it can be attached to the central block before or after the grooves have been cut.

The insulation sheet can also have an optional face reinforcement member between the central block and the barrier layer. The reinforcement member can be paper, fabric, film nonwoven web or a combination thereof. Preferably it is porous to promote adhesion of the barrier layer to the substrate insulating material. Preference is given to a nonwoven web of glass fibers having fiber diameter of about 6 to about 25 $\mu$m. The reinforcement member can be laminated to the central block prior to cutting the grooves. Because groove cutting penetrates the front face, such pre-laminated reinforcement 41 will be cut away as seen in FIG. 4. Pre-lamination is preferred in that the reinforcement member can be placed on expanded insulating material batting prior to compression to form the central block, and thereby, the member will be firmly attached to the central block, for example by adhesive or by thermal binding.

Figure 1A:
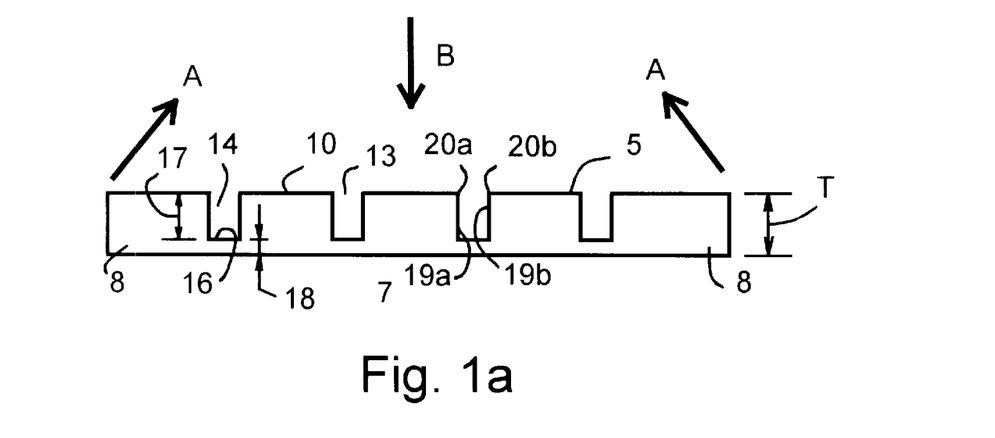
FIG. 1a is an elevation view in the second major dimension direction of the central block of the insulation sheet shown in FIG. 1.
Figure 2:
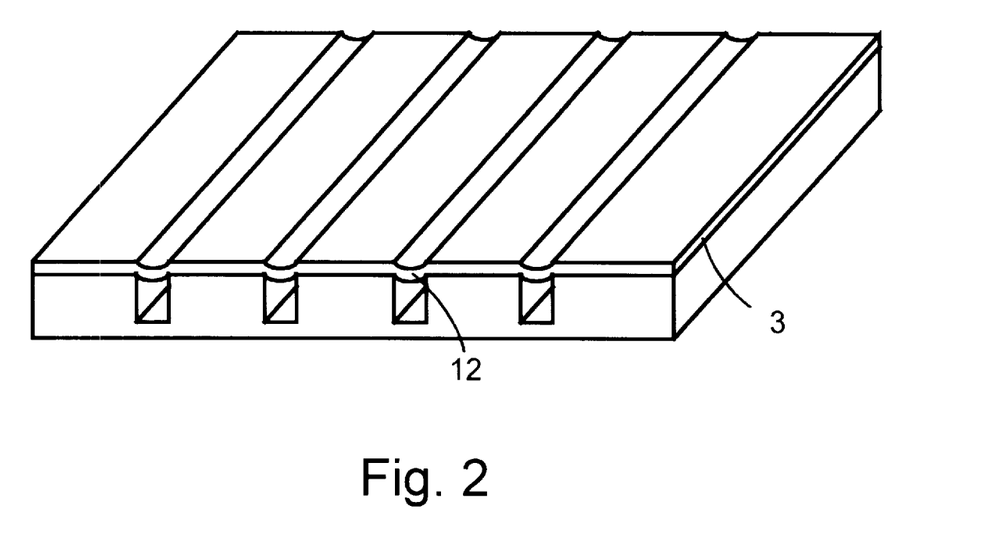
FIG. 2 is a perspective view of the embodiment of FIG. 1 showing the barrier layer assembled to the central block.
Figure 2A:
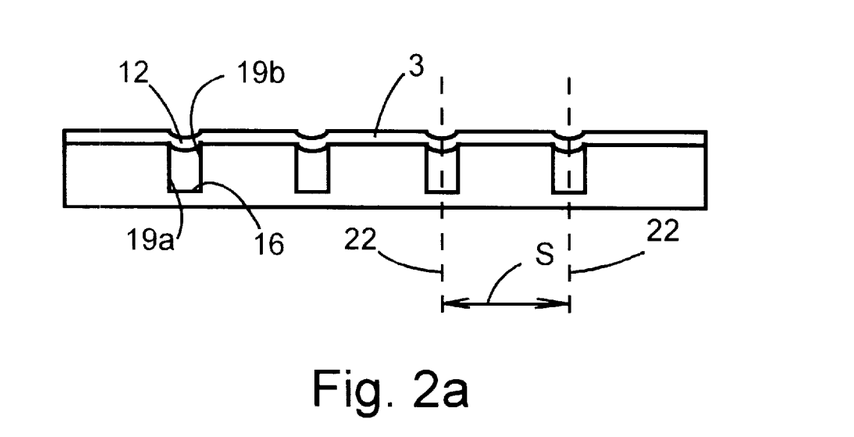
FIG. 2a is an elevation view in the second major dimension direction of the embodiment shown in FIG. 1.
Figure 8:
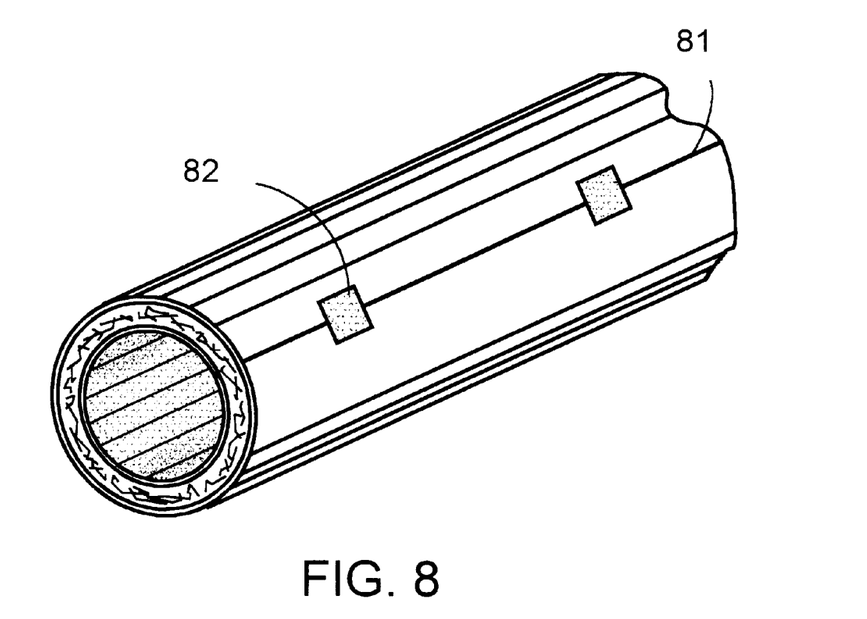
FIG. 8 is a partial perspective view of a novel circular cross section tube formed from an insulation sheet of this invention.
Figure 9:
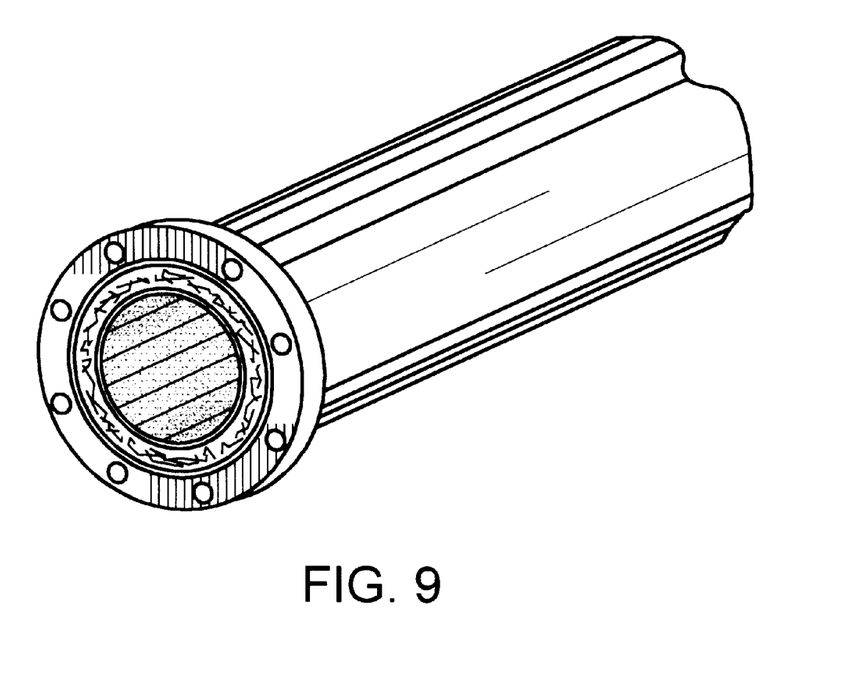
FIG. 9 is a partial perspective view of a novel circular cross section duct having a liner formed from an insulation sheet of this invention.
Figure 10:
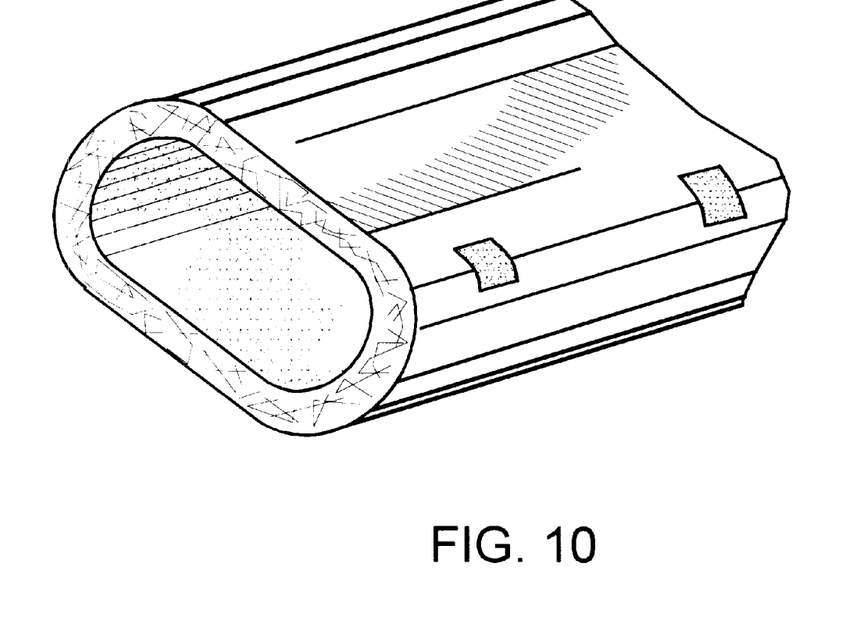
FIG. 10 is a partial perspective view of a novel flat oval cross section formed from an insulation sheet of this invention.
Figure 11:
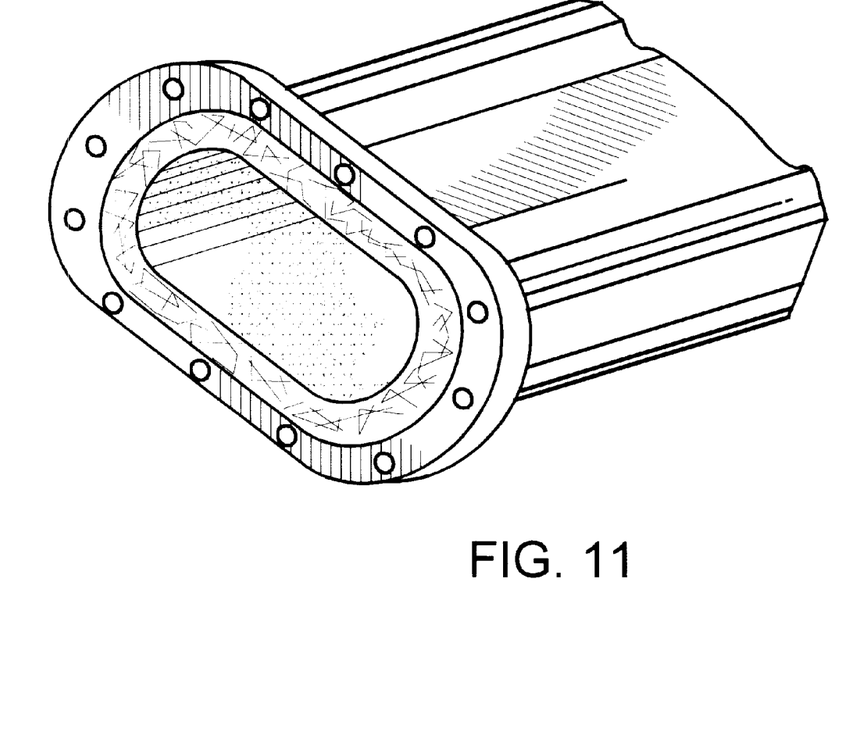
FIG. 11 is a partial perspective view of a novel flat oval cross section duct having a liner formed from an insulation sheet of this invention.

As stated, the insulation sheet can be flexed about pivotal axes parallel to and between the grooves and the back face of the block by applying pressure as shown by arrows A and B in FIG. 1a. When flexed sufficiently to bring opposite lateral edges 8 in contact, the sheet forms a tube. Such circular and flat oval tubes are illustrated in FIGS. 8 and 10, respectively. The joining of the lateral edges forms a longitudinal seam 81. Mechanical fasteners, such as tape or staples 82 can be applied to maintain the tubular shape. A tube so formed from the flexed insulation sheet can be inserted into metal casings adapted to receive the tube, thereby forming a duct. Circular and flat oval cross section ducts are illustrated in FIGS. 9 and 11, respectively.

Although specific forms of the invention have been selected for illustration in the drawings and the preceding description is drawn in specific terms for the purpose of describing these forms of the invention, this description is not intended to limit the scope of the invention which is defined in the claims.

What is claimed is:

1. An insulation sheet comprising:
   a rectangular central block of insulating material, the block having a first major dimension and a second major dimension together defining a front face and a rear face in parallel planes distant by a thickness; the block further having a plurality of grooves penetrating the front face to a floor at a depth less than the thickness and extending parallel to the second major dimension, the grooves being spaced apart from other grooves in the first major dimension direction and running the length of the second major dimension, each of the grooves having side walls which intersect with the front face to form opposing contact edges separated by a gap; and a contiguous barrier layer of an elastically deformable substance bonded adjacent to the front face, wherein the barrier layer is coextensive with the front face and bridges the gaps between opposing contact edges.

2. The invention of claim 1 wherein the insulating material comprises at least one insulating layer selected from the group consisting of cellular foam and of nonwoven fibers, and the insulating layer has a density in the range of about 0.5–7 lbs/ft$^3$.

3. The invention of claim 2 wherein the insulating material consists essentially of a monolithic web of nonwoven glass fibers.

4. The invention of claim 1 wherein the barrier layer consists essentially of a devolatilized polymeric foam present at a substantially uniform coating thickness equivalent to surface density in the range of about 2 to about 30 g dry weight per square foot of front face area.

5. The invention of claim 4 wherein the barrier layer is of an acrylic polymer latex foam.

6. The invention of claim 1 wherein the thickness is in the range of about 1–6 inches, the depth is in the range of about 50–95% of the thickness, and the grooves are spaced apart from neighboring grooves by a center line-to-center line distance of about 1–6 inches.

7. The invention of claim 6 wherein the insulation sheet further comprises a backing layer of paper, foil, fabric, nonwoven web, plastic film or combination of at least two thereof adjacent and coextensive with the rear face.

8. The invention of claim 6 wherein the insulation sheet further comprises a surface smoothing layer of nonwoven web of glass fiber intermediate the central block and the barrier layer.

9. An insulation tube including a flexed insulation sheet comprising:
   a rectangular central block of insulating material, the block having a first major dimension and a second major dimension together defining a front face and a rear face in parallel planes distant by a thickness; the block further having a plurality of grooves penetrating the front face to a floor at a depth less than the thickness and extending parallel to the second major dimension, the grooves being spaced apart from other grooves in the first major dimension direction and running the length of the second major dimension, each of the grooves having side walls which intersect with the front face to form opposing contact edges separated by a gap; and
   a contiguous barrier layer of an elastically deformable substance bonded adjacent to the front face, wherein the barrier layer is coextensive with the front face and bridges the gaps between opposing contact edges,
wherein the insulation sheet is flexed about groove axes parallel to the second major dimension such that the front face exhibits an approximately concave curvature viewed in a plane perpendicular to the axis.

10. A duct comprising
   a tubular metal case having an axis of elongation; and
   a flexed insulation sheet inserted in the metal case, the sheet including
      a rectangular central block of insulating material, the block having a first major dimension and a second major dimension together defining a front face and a rear face in parallel planes distant by a thickness; the block further having a plurality of grooves penetrating the front face to a floor at a depth less than the thickness and extending parallel to the second major dimension, the grooves being spaced apart from other grooves in the first major dimension direction and running the length of the second major dimension, each of the grooves having side walls which intersect with the front face to form opposing contact edges separated by a gap; and
      a contiguous barrier layer of an elastically deformable substance bonded adjacent to the front face, wherein the barrier layer is coextensive with the front face and bridges the gaps between opposing contact edges,
wherein the insulation sheet is flexed about groove axes parallel to the second major dimension such that the front face exhibits an approximately concave curvature viewed in a plane perpendicular to the groove axis, and wherein the groove axes are aligned parallel to the axis of elongation.

11. A method of making an insulation sheet comprising the steps of
   providing a rectangular central block of insulating material, the block having a first major dimension and a second major dimension together defining a front face and a rear face in parallel planes distant by a thickness;
   cutting a plurality of grooves that penetrate the front face to a floor at a depth less than the thickness and extend parallel to the second major dimension, the grooves being spaced apart from other grooves in the first major dimension direction and run the length of the second major dimension, each of the grooves having side walls which intersect with the front face to form opposing contact edges separated by a gap;
   foaming an elastically deformable substance;
   after cutting of grooves, depositing on the front face a bead of the foamed substance along the length of the second major dimension;
   drawing the bead in the first major dimension direction with a blade, thereby coating the front face with foam; and
   devolatilizing the foam to form a contiguous barrier layer of the elastically deformable substance bonded adjacent to the front face, wherein the barrier layer is coextensive with the front face and bridges the gaps between opposing contact edges.

12. The invention of claim 11 wherein the elastically deformable substance comprises a polymeric composition selected to provide the barrier layer after devolatilizing.

13. The invention of claim 11 wherein the devolatilizing step includes heating the foamed elastically deformable substance at an elevated temperature and for duration effective to remove all liquid from the foam.

14. A method of making an insulation sheet comprising the steps of
   providing a rectangular central block of insulating material, the block having a first major dimension and a second major dimension together defining a front face and a rear face in parallel planes distant by a thickness;
   cutting a plurality of grooves that penetrate the front face to a floor at a dept less than the thickness and extend parallel to the second major dimension, the grooves being spaced apart from other grooves in the first major dimension direction and run the length of the second major dimenision, each of the grooves having side walls which intersect with the front face to form opposing contact edges separated by a gap;
   aerating an acrylic polymer latex to produce a foam of an elastomerically deformable substance which foam has a density in range of about 0.1–0.9 g/cm$^3$;
   after cutting of grooves, depositing on the front face a bead of the foamed substance along the length of the second major dimension;

drawing the bead in the first major dimension direction with a blade, thereby coating the front face with foam; and devolatilizing the foam to form a contiguous barrier layer of the elastically deformable substance bonded adjacent to the front face, wherein the barrier layer is coextensive with the front face and bridges the gaps between opposing contact edges.

* * * * *